United States Patent
Shelton et al.

(10) Patent No.: US 6,854,225 B2
(45) Date of Patent: Feb. 15, 2005

(54) SELF-ADJUSTING LOWER LOADING DOCK SEAL

(75) Inventors: Michael J. Shelton, Fort Wayne, IN (US); Robert Michael Esperto, Alpharetta, GA (US)

(73) Assignees: United Parcel Service of America, Inc., Atlanta, GA (US); M&J Shelton Enterprises, Inc., Ft. Wayne, IN (US)

( * ) Notice: Subject to any disclaimer, the term of this patent is extended or adjusted under 35 U.S.C. 154(b) by 0 days.

(21) Appl. No.: 10/340,197

(22) Filed: Jan. 10, 2003

(65) Prior Publication Data

US 2003/0177719 A1 Sep. 25, 2003

Related U.S. Application Data

(60) Provisional application No. 60/347,430, filed on Jan. 10, 2002.

(51) Int. Cl.[7] ............................................. E04H 14/00
(52) U.S. Cl. .................. 52/173.2; 49/480.1; 49/498.1
(58) Field of Search ......................... 52/173.2, 2.12; 49/480.1, 498.1, 505, 504

(56) References Cited

U.S. PATENT DOCUMENTS

| | | | | |
|---|---|---|---|---|
| 3,203,002 A | * | 8/1965 | McGuire | 14/71.3 |
| 3,375,625 A | * | 4/1968 | Edkins et al. | 52/173.2 |
| 4,015,380 A | | 4/1977 | Chalfant | |
| 4,349,992 A | * | 9/1982 | Layne | 52/173.2 |
| 4,554,768 A | | 11/1985 | Srajer | |
| 4,682,382 A | | 7/1987 | Bennett | |
| 4,724,648 A | * | 2/1988 | Diepholder | 52/173.2 |
| 5,282,342 A | | 2/1994 | Brockman et al. | |
| 5,675,945 A | | 10/1997 | Giuliani et al. | |
| 5,996,291 A | | 12/1999 | Styba et al. | |
| 6,006,389 A | * | 12/1999 | Alexander | 14/71.1 |
| 6,272,799 B1 | * | 8/2001 | Ashelin et al. | 52/173.2 |

* cited by examiner

Primary Examiner—Naoko Slack
(74) Attorney, Agent, or Firm—Alston & Bird, LLP

(57) ABSTRACT

A self-adjusting loading dock seal engages a vehicle and facilitates at least one of loading and unloading thereof relative to a loading dock. The loading dock seal includes at least one dock attachment member, a dock seal member, and at least one spring-loaded adjustment member. The dock attachment member is configured for attachment to a loading dock. The dock seal member is positioned above the dock attachment member and is configured for sealingly engaging a vehicle positioned thereagainst. Each spring-loaded adjustment member operatively connects a dock attachment member to the dock seal member, and is configured for facilitating limited vertical movement of the dock seal member relative to the dock attachment member.

17 Claims, 8 Drawing Sheets

SELF-ADJUSTING LOWER LOADING DOCK SEAL

CROSS REFERENCE TO RELATED PENDING APPLICATION

This application hereby claims the benefit and priority under Title 35, United States Code §119(e) of United States Provisional Application No. 60/347,430 filed on Jan. 10, 2002.

BACKGROUND OF THE INVENTION

1. Field of the Invention

The present invention relates to a loading dock seal provided at the opening or doorway of a building to facilitate loading or unloading of trucks or trailers, and more particularly to a lower dock seal which engages the lower portion of the truck or trailer while self-adjusting for potential vertical vehicle movement.

2. Description of the Related Art

Conventional parcel delivery trucks and trailers typically do not utilize forklifts for unloading or loading parcels on the truck or trailer. As such, parcels are thereby moved by hand and necessitate the human unloader or loader to traverse the interface gap between the loading dock and the vehicle bed or bumper. The gap is typically formed between the parked truck or trailer and the dock through which parcels may fall, or insects, rodents, or the environment (rain, snow, cold, heat) may pass. Stationary dock seals suffer from damage by the rear of the vehicle or trailer moving up or down during the loading or unloading process.

The present invention solves the above problems by forming a self-adjusting lower dock seal.

SUMMARY OF THE INVENTION

According to the present invention, a dock seal attached to the loading dock is constructed which sealably maintains engagement with the rear or bottom of the doorway or bed of trucks, trailers, or other vehicles. The self-adjusting lower loading dock seal of the present invention provides a safe, gap-free area which seals out insects, rodents, and the environment, while further preventing lose debris or parcels from passing through the gap from or to the ground below. The present invention further eases the loaders and unloaders transition to or from the rear of the truck or trailer to the loading dock.

In one embodiment, the lower loading dock seal includes a plurality of (e.g., two) self-adjusting, leveling spring actuated brackets which are attached to the lower face of the doorway or opening of the building to facilitate the loading or unloading of trucks or trailers. The lower dock seal further includes a compressible foam or rubber core bonded to a back assembly or board, the width being that desired of the doorway opening. The board and core are typically covered with a protective outer covering to protect it from the environment. This compressible lower loading dock seal member is attached to the self-adjusting spring actuated brackets by fasteners such as bolts.

In another general embodiment, a self-adjusting loading dock seal for engaging a vehicle and facilitating at least one of loading and unloading thereof relative to a loading dock is disclosed. The loading dock seal comprises at least one dock attachment member configured for attachment to the loading dock, a dock seal member positioned above the dock attachment member and configured for sealingly engaging a vehicle positioned thereagainst, and at least one spring-loaded adjustment member operatively connecting one the dock attachment member to said dock seal member. Each spring-loaded adjustment member is configured for facilitating limited vertical movement of the dock seal member relative to the dock attachment member.

As the rear portion of the truck, trailer, or vehicle constantly has the potential to move vertically up and down while it is positioned at the doorway for loading or unloading, the weight or products being loaded or unloaded from the truck can cause the vehicle's vertical position to change due to the suspension of the vehicle moving up and down during the process of loading or unloading.

One advantage of the present invention is that the spring actuated, self-adjusting brackets, accommodate vertical vehicle movement, eliminating or at least reducing wear between the dock seal and vehicle and providing a level, sealed transition from the truck, trailer, or vehicle to the loading dock floor area.

Another advantage of the present invention, in one form, is that the gap between the truck, trailer, or vehicle bed is now sealed to the loading dock during the loading or unloading process. Such elimination of the previous gap discourages articles from falling through along with discouraging insects, rodents, or environment factors from passing through the gap.

Still another advantage of the present invention is that it eases the transition to and from the rear of the truck, trailer, or vehicle for various loading or unloading personnel.

Yet another advantage of the present invention is that spring loaded brackets automatically compensate for vertical movement of the vehicle during the unloading or loading process.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The present invention is a self-adjusting lower loading dock seal 10 attached to the front portion (loading dock front surface 22) of a loading dock or building to which a truck, trailer, or vehicle (not shown) is parked against for loading or unloading of parcels or products. U.S. provisional patent application No. 60/347,430 by the present inventors is hereby explicitly incorporated by reference.

Figure 1:
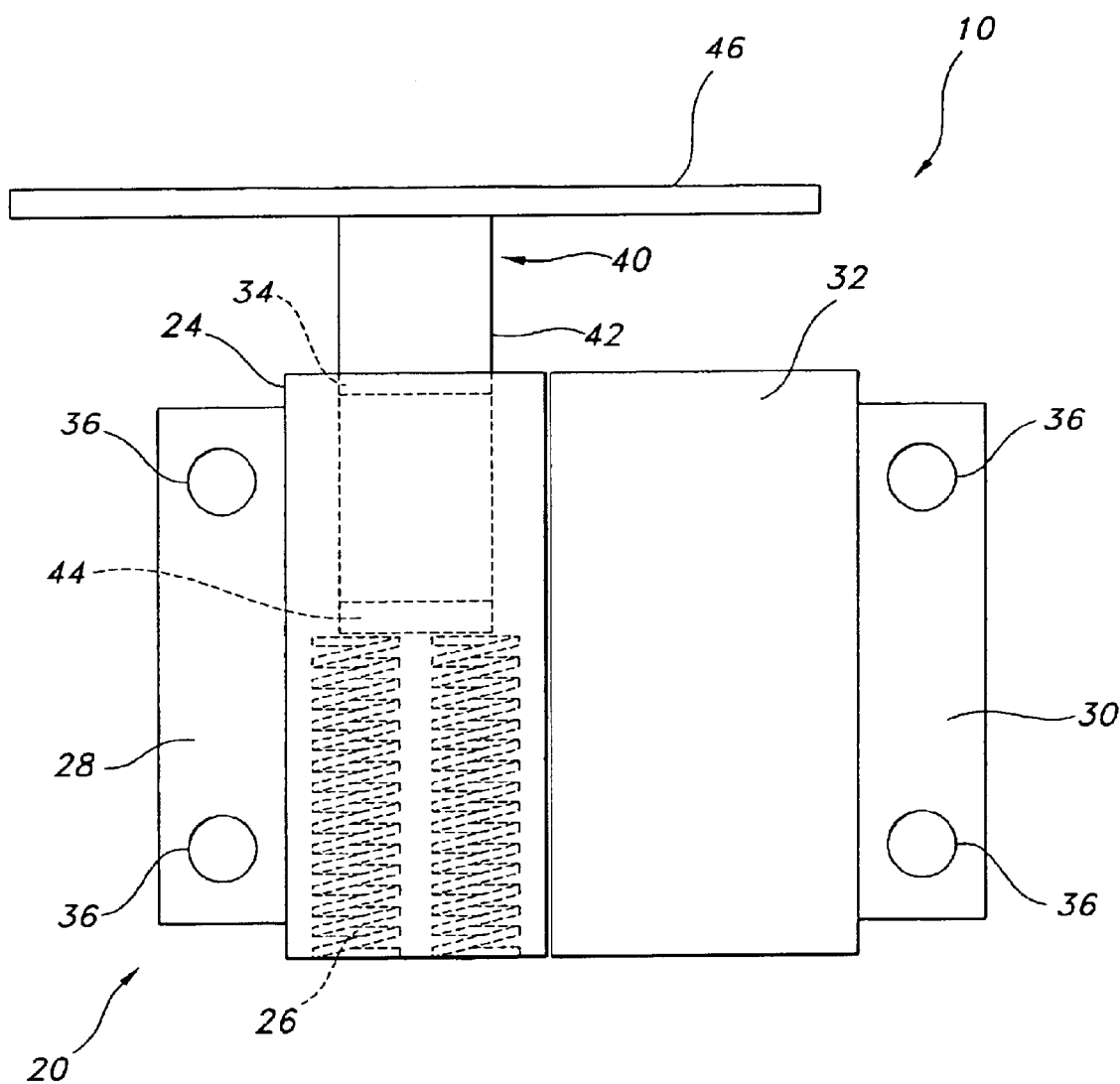
FIG. 1 is a front view of the dock seal attachment bracket assembly of the present invention.
Figure 4:
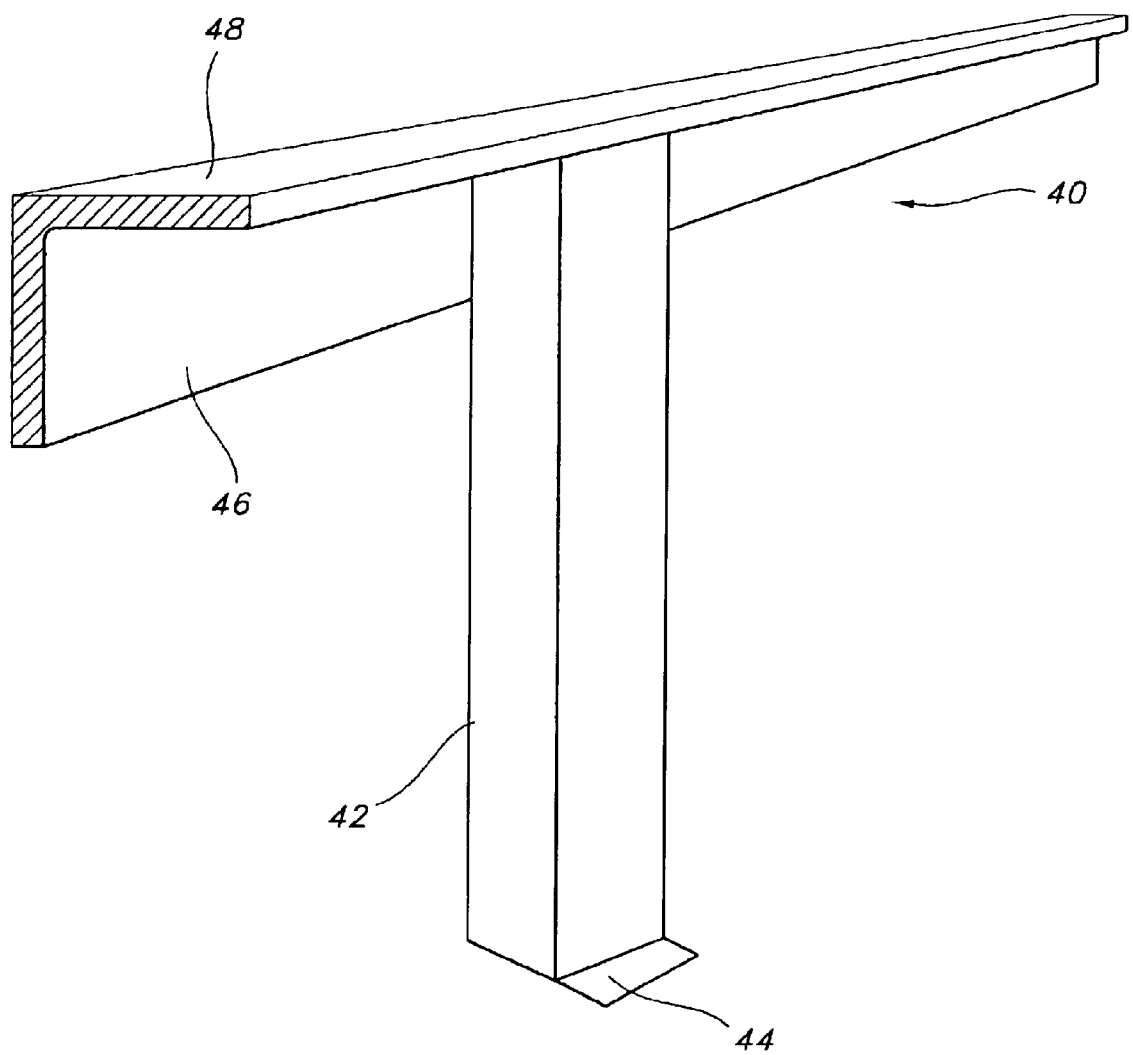
FIG. 4 is a perspective view of the T-bracket assembly of the present invention.
Figure 5:
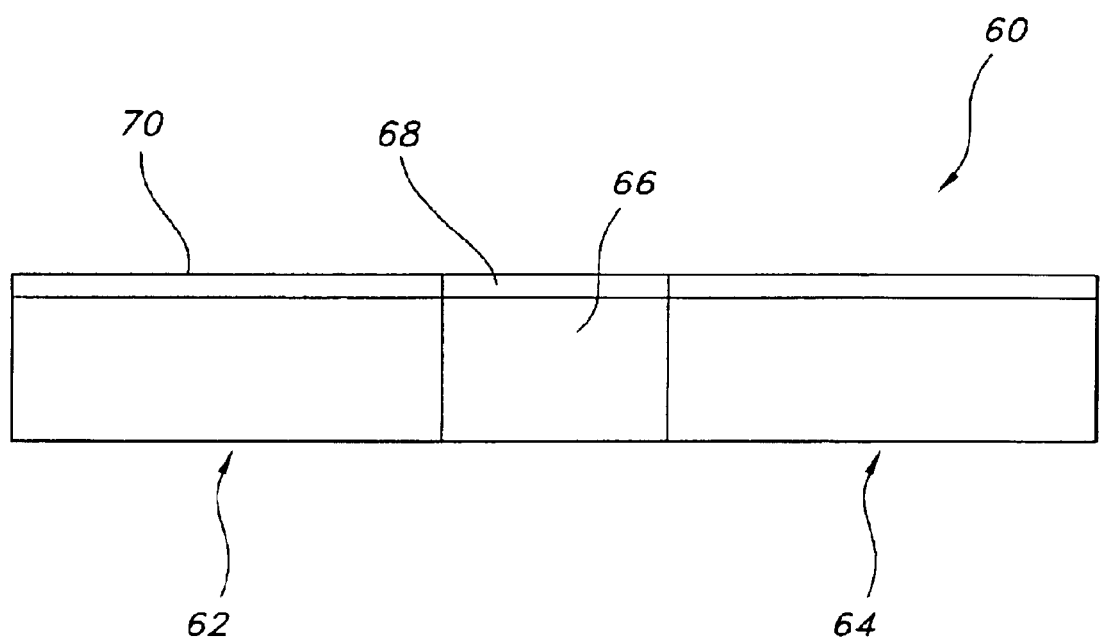
FIG. 5 is a front view of the bottom dock seal.

The self-adjusting lower loading dock seal assembly 10 includes three main parts: a dock seal attachment bracket assembly member 20 (as shown in FIG. 1, two used per assembly 10), a spring loaded adjustment member such as a T-bracket member 40 (shown in FIG. 4, one per member 20), and a resilient bottom seal member 60 (shown in FIG. 5).

Figure 8:
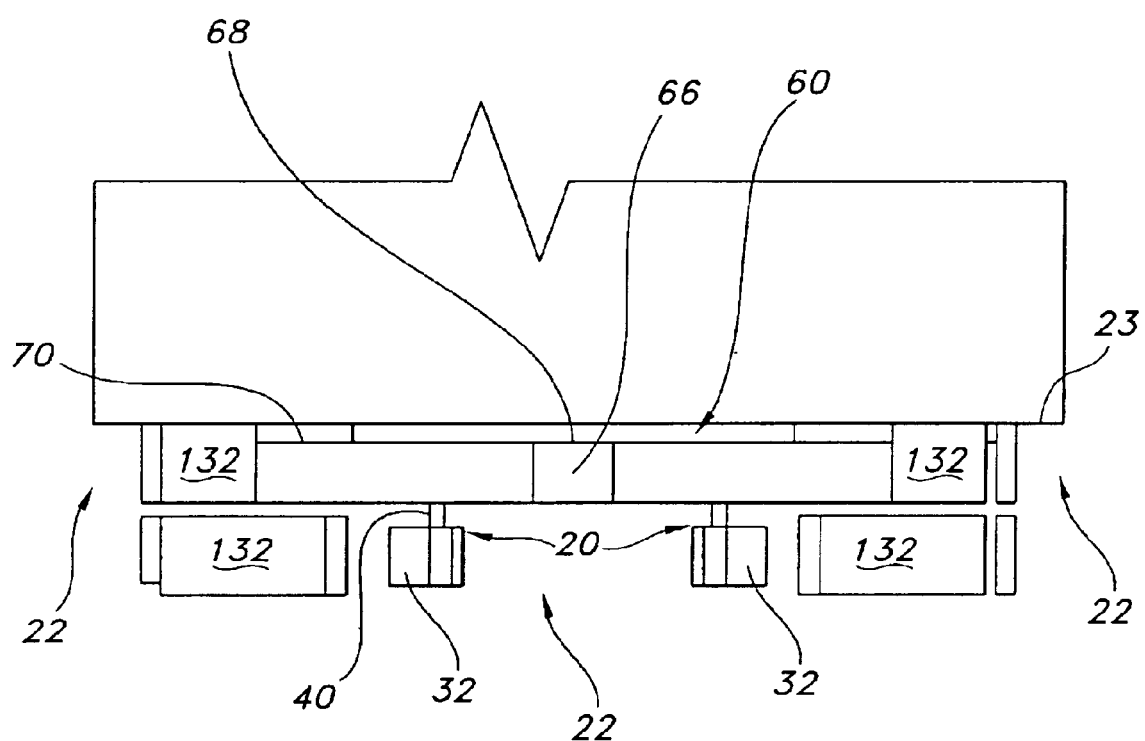
FIG. 8 is a front elevational view of one form of the present invention attached to a loading dock.

The assembly view of the present invention, in one form (as shown in FIG. 8), shows the dock seal attachment bracket assemblies 20 attached to a portion of loading dock front surface 22. T-bracket members 40 interfit within attachment bracket assembly 20 and are connected to resilient bottom seal member 60, thus allowing resilient bottom seal member 60 to move vertically upwards and downwards relative to attachment bracket assembly or member 20 during potential vehicle movement, assuming the frictional contact between the vehicle and the seal member is great enough.

Referring to FIG. 1, an enlarged view of dock seal attachment bracket assembly 20 is shown with an interfit T-bracket member 40. Attachment bracket assembly 20 includes a receiving tube, such as square tube section 24 for receiving both a biasing means 26 and a downwardly extending member 42 of T-bracket member 40. Square tube 24 contains biasing means 26, such as coil springs or other type(s) of spring members, to give the functionality of biasing self-adjustment of the vertical location to the downward extending member 42 and also to the resilient bottom seal member 60. A safety catch 44 is attached to downwardly extending member 42 to prevent downwardly extending member 42 from being entirely withdrawn vertically through square tube 24 when T-bracket 40 and seal member 60 are possibly lifted by upward vehicle movement. Although receiving tube 24 is identified as being a square tube, alternate geometries may be utilized. Receiving tube 24 is attached to a left mounting bracket 28 as by typical fasteners. A right mounting bracket 30 is attached to a laminated rubber bumper 32, which is attached to the right side of receiving tube 24. Rubber bumper 32 provides for cushion during the initial contact with the parcel truck, trailer, or vehicle backed up or parked against loading dock front surface 22.

Figure 2:
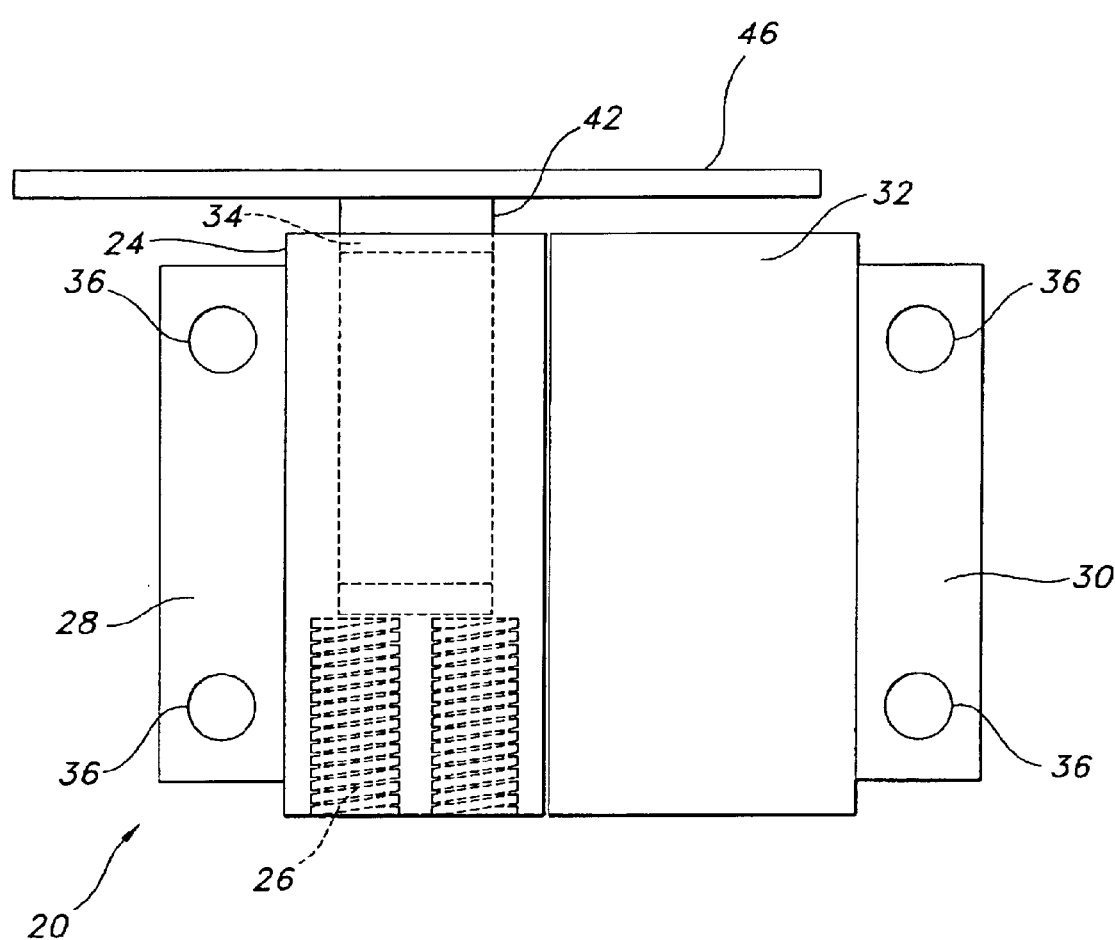
FIG. 2 is a front view of the attachment bracket assembly of FIG. 1 in the lower position.

Operation of the attachment bracket assembly 20 as shown in FIG. 1 is indicated in its non-biased, central position. FIG. 2 shows the same attachment bracket assembly in which the downwardly extending member 42 is displaced further vertically downwardly into receiving tube 24, thereby lowering resilient bottom seal member 60, as would occur during vehicle movement during a loading process, assuming the vehicle was in sufficient frictional contact or other suitable engagement with the bottom seal member.

Alternatively, in an unloading process, downwardly extending member 42 may be raised further out of receiving tube 24 up to the limit of safety catch 44, thereby being caught by a catch member shown by hidden line 34. The interfitting of safety catch 44 with catch member 34 prevents removal of downward extending member 42 from receiving tube 24 during the loading or unloading operation of the adjacently parked truck, trailer, or vehicle.

Brackets 28 and 30 include bores 36 for passing of fasteners or bolts through the mounting bracket into the loading dock front service 22. Alternatively other attachment means maybe utilized.

Figure 3:
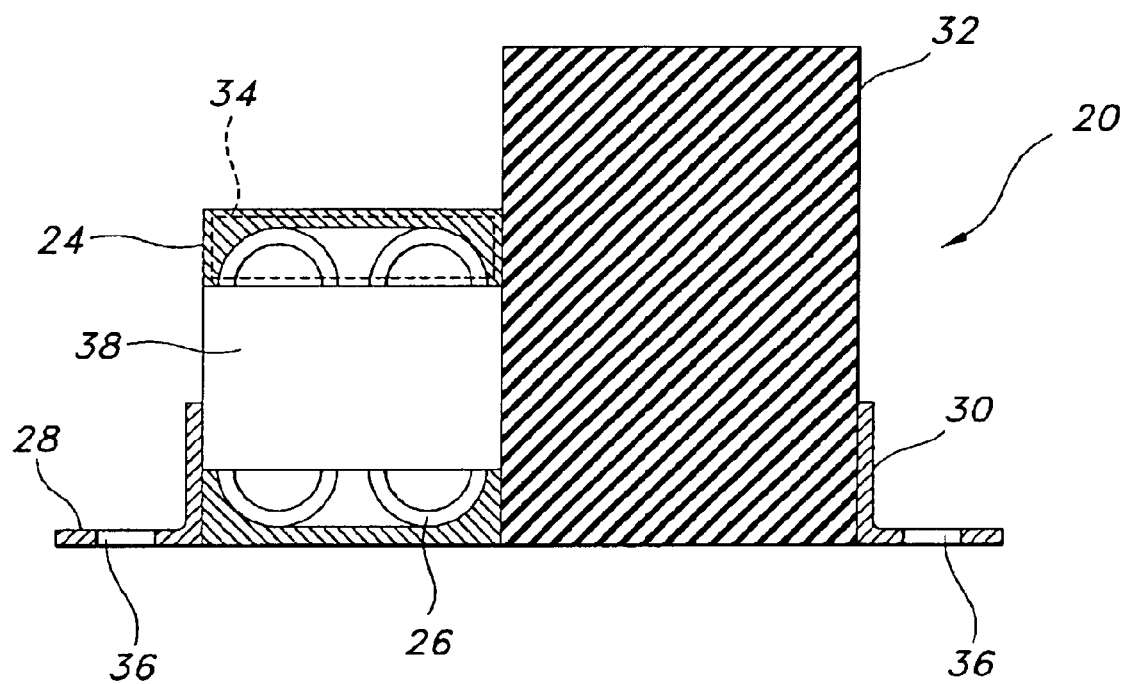
FIG. 3 is a bottom view of the attachment bracket assembly of FIG. 1.

As seen from the bottom view of attachment bracket assembly 20 (FIG. 3), a retaining member 38 is attached across the bottom opening of receiving tube 24 to contain biasing means or spring 26. Retaining member 38, mounting brackets 30, 32, and receiving tube 24 may all be constructed out of a metal such as, for example, steel or aluminum.

FIG. 4 shows a perspective view of the T-bracket member 40 including downwardly extending member 42. Downwardly extending member 42 is formed from a metal square tube portion, although other materials and geometries may be utilized. Downwardly extending member 42 further has a safety catch 44 located on the immediate front bottom portion thereof. Angle iron cross member 46 is connected or attached to downwardly extending member 42 along the top surface to provide an engagement surface 48 for attachment to bottom seal member 60. Alternatively, other geometries may be utilized for creating a connection interface between the downwardly extending member 42 (which slides within receiving tube 24) and resilient bottom seal member 60.

FIG. 5 shows a front view of resilient bottom seal member 60 having a left portion 62 and a right portion 64 divided by a void space 66. Void 66, between the portion 62 and 64, permits an operator access to a backdoor handle or other door lock member of a truck, trailer, or vehicle parked sealingly against resilient bottom seal member 60. A top removable portion 68 overlies the void 66, thereby creating a complete, flat planar top surface 70. Planar top surface 70 forms a step to or is co-planar with the loading dock top surface 23.

Figure 7:
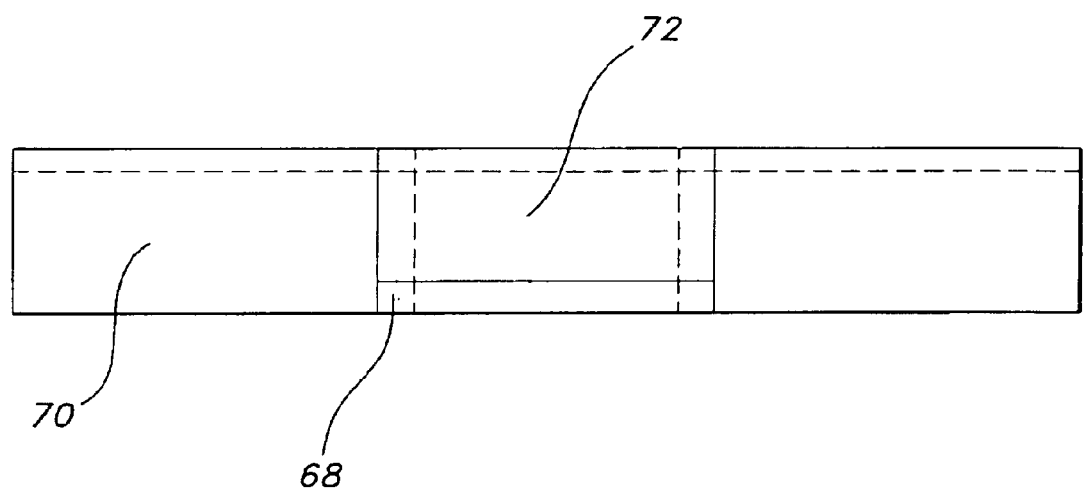
FIG. 7 is a plan view of the bottom dock seal of FIG. 5.

In one embodiment of bottom seal member 60, as shown in FIG. 7, top removable portion 68 is a flat bar sewn within an access flap of a removable outer skin cover 72 connected to the outer skin cover 74 of bottom seal 60. The outer skin cover 74 may be made from vinyl, nylon, plastic, urethane, or other materials resistant to the outside environment.

Figure 6:
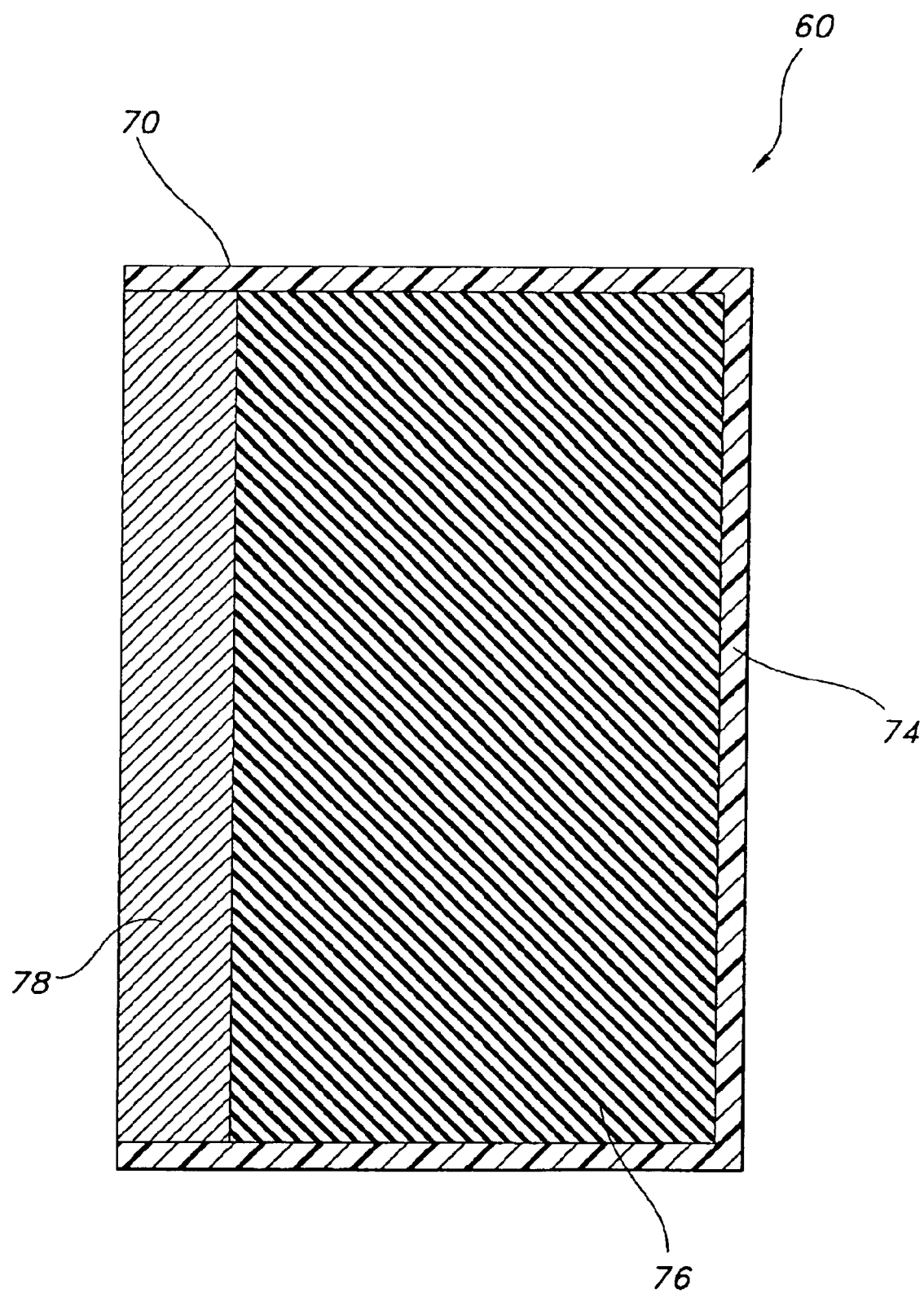
FIG. 6 is a side view of the bottom dock seal of FIG. 5.

As shown in FIG. 6, outer skin cover 74 surrounds the bottom seal member 60. Bottom seal member 60 includes a high compression core 76 formed of, e.g., urethane foam or a rubber material. High compression core 76 is attached to a metal or wood backing plate member 78. Backing plate member 78 is connected via fasteners to either cross member 46, surface 48, or downwardly extending members 42 to permit vertical movement of downwardly extending member 42 to be communicated to bottom seal member 60.

FIG. 8 shows a front assembly view of the present invention to which a truck, trailer, or vehicle would back to and park. Note rubber bumpers 132 which supplement bumpers 32. Top removable portion 68 along with void 66 permits the operator to then access the rear vehicle rolling door handle (not shown) for opening of the door of the vehicle. During loading and unloading, removable portion 68 forms a load bearing portion which bridges left portion 62 and right portion 64, thereby supporting as much load as the other portions of bottom seal member 60.

During the unloading or loading of a vehicle parked against loading dock front surface 22, resilient bottom seal member 60 seals the gap between the truck or vehicle bed or bumper and the front surface 22, thereby forming a sealed engagement between the loading dock and the vehicle. During the loading or unloading process, and/or shifting weight within the vehicle, the back portion of the vehicle will raise or lower. Such movement may now be accommodated by the resilient bottom seal 60 moving along the permitted freedom of downward extending member 42 within receiving tube 24.

Access of movement of downwardly extending member 42, and therefore, resilient bottom seal 60 is limited on the downward side by biasing means 26 and in the upper direction via the safety catch 44 interfitting and catching the catch member 34 across the top portion of receiving tube 24. In all cases during operation, T-bracket member 40 is held within receiving tube 24.

The present invention offers a self-adjusting system to accommodate vertical movement of the rear of a truck, trailer, or vehicle providing an even seal transition from the back of the truck, trailer, or vehicle to the loading dock floor area.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed:

1. A self-adjusting loading dock seal for engaging a vehicle and facilitating at least one of loading and unloading thereof relative to a loading dock, said loading dock seal comprising:
   at least one dock attachment member configured for attachment to the loading dock and including a receiving tube therein;
   a dock seal member positioned above said dock attachment member, said dock seal member configured for sealingly engaging a vehicle positioned thereagainst; and
   at least one spring-loaded adjustment member operatively connecting one said dock attachment member to said dock seal member, each said spring-loaded adjustment member being configured for facilitating limited vertical movement of said dock seal member relative to said dock attachment member.

2. The self-adjusting loading dock seal of claim 1, wherein said receiving tube receives a corresponding said spring-loaded adjustment member therein.

3. The self-adjusting loading dock seal of claim 1, wherein each said spring-loaded adjustment member includes a spring member and a connective extension member, said spring member and said connective extension member being mounted in said receiving tube of one dock attachment member.

4. The self-adjusting loading dock seal of claim 3, wherein each said dock attachment member has a retaining member associated with a bottom opening of said receiving tube thereof, said spring member being elastically mounted between said retaining member and said connective extension member.

5. The self-adjusting loading dock seal of claim 3, wherein said connective extension member is a T-bracket member, said T-bracket member including a horizontal cross member and a downwardly extending member, said horizontal cross member being connected to said dock seal member, said downwardly extending member being slidably mounted in said receiving tube.

6. The self-adjusting loading dock seal of claim 5, wherein said downwardly extending member has a safety catch at a distal end thereof, said safety catch configured for preventing complete removal of said downwardly extending end from said receiving tube.

7. The self-adjusting loading dock seal of claim 1, wherein each said dock attachment member includes at least one dock attachment bracket thereon.

8. The self-adjusting loading dock seal of claim 1, wherein each said dock attachment member includes at least one dock bumper.

9. The self-adjusting loading dock seal of claim 1, wherein said dock seal member includes a right seal portion, a left seal portion, and a central seal portion, said central seal portion defining a void space, said void space being configured for accommodating at least one of a backdoor handle and a door lock member of the vehicle parked adjacent thereto.

10. The self-adjusting loading dock seal of claim 9, wherein said dock seal member further includes a top removable portion, said top removable portion overlying said void space, said top removable portion being removable to permit access to said at least one of a backdoor handle and a door lock member, said top removable portion further configured for acting as a load-bearing bridge between said right seal portion and said left seal portion during at least one of loading and unloading.

11. The self-adjusting loading dock seal of claim 1, wherein said dock seal member includes a foam core and an outer skin cover, said outer skin cover at least partially covering said foam core.

12. The self-adjusting loading dock seal of claim 11, wherein said outer skin cover is removable and is made of a durable, environment-resistant material.

13. The self-adjusting loading dock seal of claim 1, wherein said dock seal member includes a compressible core and a backing plate connected thereto, said backing plate facilitating attachment of said dock seal member to said at least one spring-loaded adjustment member.

14. The self-adjusting loading dock seal of claim 13, wherein said compressible core is comprised of at least one of a rubber material and a high compression urethane foam material.

15. A self-adjusting loading dock seal for engaging a vehicle and facilitating at least one of loading and unloading thereof relative to a loading dock, said loading dock seal comprising:
   at least one dock attachment member configured for attachment to the loading dock;
   a dock seal member positioned above said dock attachment member, said dock seal member configured for sealingly engaging a vehicle positioned thereagainst and including a right seal portion, a left seal portion, and a central seal portion, said central seal portion defining a void space, said void space being configured for accommodating at least one of a backdoor handle and a door lock member of the vehicle parked adjacent thereto; and
   at least one spring-loaded adjustment member operatively connecting one said dock attachment member to said dock seal member, each said spring-loaded adjustment member being configured for facilitating limited vertical movement of said dock seal member relative to said dock attachment member.

16. The self-adjusting loading dock seal of claim 15, wherein said dock seal member further includes a top removable portion, said top removable portion overlying said void space, said top removable portion being removable to permit access to said at least one of a backdoor handle and a door lock member, said top removable portion further configured for acting as a load-bearing bridge between said right seal portion and said left seal portion during at least one of loading and unloading.

17. A self-adjusting loading dock seal for engaging a vehicle and facilitating at least one of loading and unloading thereof relative to a loading dock, said loading dock seal comprising:

two separate and spaced-apart dock attachment members, each configured for attachment to the loading dock a predetermined distance apart, and each including a receiving tube therein;

an elongate dock seal member positioned above both of said dock attachment members and being of a sufficient length so as to span said predetermined distance between said spaced-apart dock attachment members, said dock seal member defining an elongate surface configured for sealingly engaging a portion of a vehicle positioned thereagainst; and at least one spring-loaded adjustment member operatively connecting each dock attachment member to said dock seal member, each said spring-loaded adjustment member being configured for facilitating limited vertical movement of said dock seal member relative to said dock attachment member, such that when a vehicle is positioned thereagainst said elongate surface of said dock seal member with a sufficient force, and the portion of said vehicle contacting said dock seal member moves vertically up or down relative to the loading dock, said dock seal member is likewise moved vertically up or down relative to said loading dock due to friction between said vehicle and said dock seal member.

* * * * *